INVENTORS
Joseph H. Cox and
Lee A. Kilgore.
ATTORNEY

Patented Mar. 18, 1941

2,235,398

UNITED STATES PATENT OFFICE 2,235,398

VOLTAGE CONTROL SYSTEM

Joseph H. Cox and Lee A. Kilgore, Forest Hills, Pa., assignors to Westinghouse Electric & Manufacturing Company, East Pittsburgh, Pa., a corporation of Pennsylvania Application April 14, 1938, Serial No. 201,973

4 Claims. (Cl. 175—363)

Our invention relates to an electric conversion system, and particularly, to a conversion system having a substantially flat regulation characteristic over a predetermined load range, for instance, a substantially constant voltage from light load to full load.

In the operation of vapor-electric converters, or in general, valve-type converters, there is an inherent regulation or voltage drop between light load and full load operation. This is particularly noticeable when such conversion systems are operating at the end of relatively long supply lines where the line inductance results in an excessive voltage drop at normal load requirements. On such systems there is not only the normal regulation of the converter, but if the converter is operating in parallel with other current consuming devices, there will be a substantial voltage variation applied to the converter, depending upon the additional load imposed on the line.

In the regulating system according to our invention, a control valve type converter, such as a grid-controlled rectifier, or a make-alive type rectifier, is provided with a control system having compound characteristics which compensate not only for voltage variations which may be applied from the line, but also to correct the inherent regulation characteristics of the conversion apparatus itself.

According to our invention, this is accomplished by providing a constant potential bias to a grid excitation supply regardless of any variation in the potential applied to the converter, and a variable bias potential proportional to the load on the converter, and balancing these two bias potentials against a negative bias preferably provided by, or at least equal to, the direct-current potential. We have provided such a system in which the negative potential is secured directly from the negative terminal of the direct-current system and the positive potentials are secured by means of voltage sources, one of which is supplied by a constant potential device, and the other of which is supplied by a current transformer energized by the current flow through the device, the algebraic sum of these biasing potentials being impressed on a suitable excitation device such as a control transformer.

It is accordingly an object of our invention to provide a control system which will maintain a comparatively constant output voltage for any given load, regardless of variations in supply potential.

It is a further object of our invention to provide a control system having any desired compound characteristic.

It is a further object of our invention to provide a control system having a substantially flat load characteristic over a predetermined range.

It is a further object of our invention to provide a regulating system which will compensate the normal regulation characteristic of the converter.

Other objects and advantages of our invention will be apparent from the following detailed description taken in conjunction with the accompanying drawings, in which.

Figure 1:
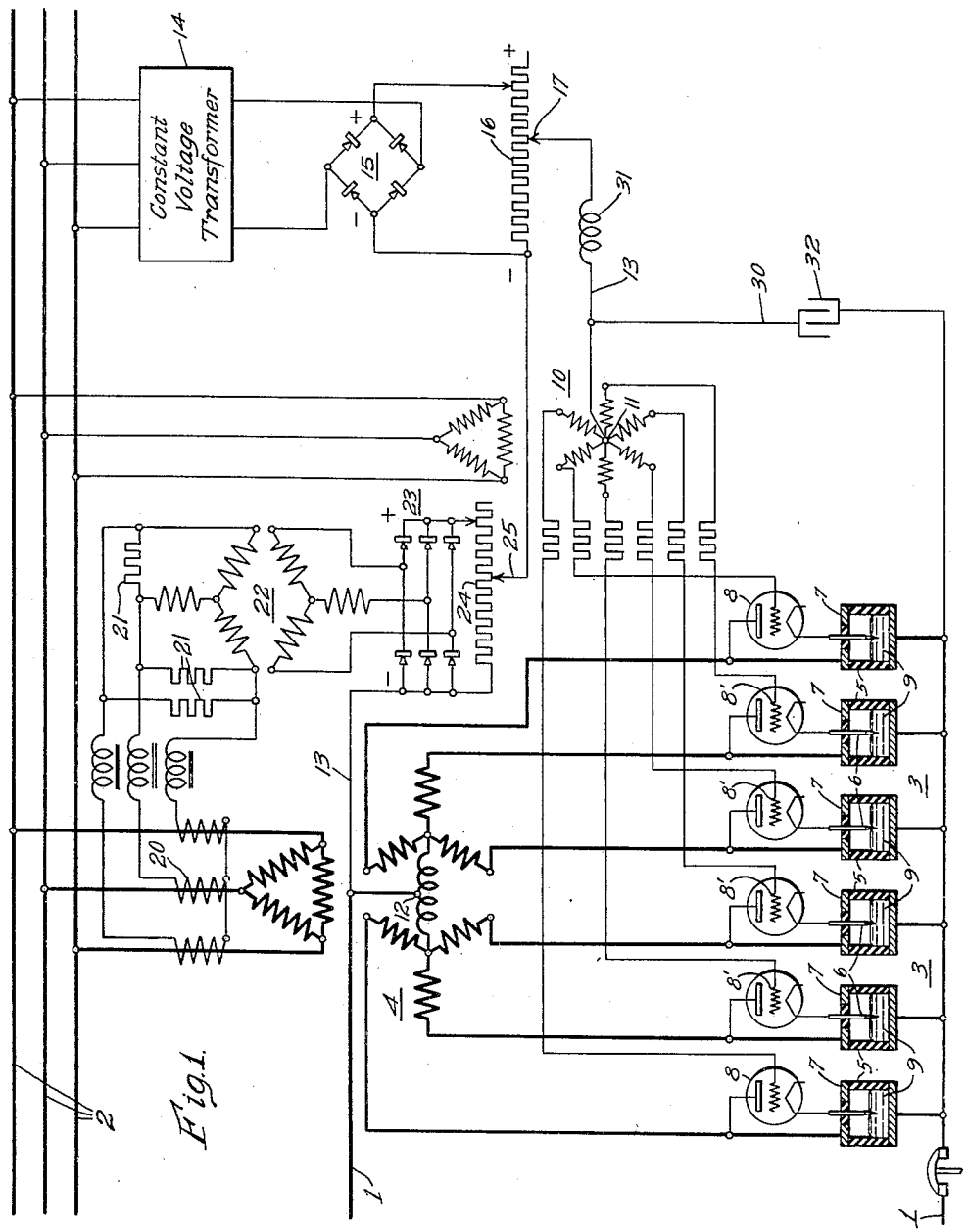
Figure 1 is a schematic illustration of the valve-type converter utilizing our invention.

In the illustrative embodiment of our invention according to Fig. 1, a direct-current load system 1 is supplied from an alternating-current supply circuit 2 by means of the valve-type converter herein illustrated as a make-alive type converter 3, the valves of which are fed by a suitable transformer 4 herein illustrated as a double three-phase with inter-phase. Each of the valves 5 of the converter 3 is provided with a make-alive electrode 6 of well-known construction, the make-alive electrodes 6 being energized from the corresponding anode 7 by means of a suitable control tube 8 which is controlled by a suitable control device, such as a control transformer 10.

In order to regulate the load characteristic of the converter 3, a suitable bias is applied to the control transformer. This bias comprises several portions, one of which is a negative bias secured by a connection 13 from the neutral point 11 of the secondary of the control transformer 10 to the negative terminal 12 of the direct-current circuit 1. This negative bias is counter-balanced by connecting in series therewith two suitable positive potentials. One of these potentials is secured by means of a constant potential transformer 14, or any suitable constant potential source such as a synchronous motor generator set, or any suitable constant potential generator.

The output potential of this constant voltage source 14 is rectified if necessary by a rectifying device herein illustrated as a Gretz connected rectifier 15, the output potential of this rectifier 15 being supplied to a suitable resistor 16 preferably in the nature of a potentiometer. In order to secure any desired portion of this constant potential as a bias, the biasing circuit 13 is connected to the resistor element 16 by means of a suitable adjustable connection 17. That portion of the bias proportional to the load is secured by means of a suitable current transformer 20 interlinked with the supply line of the transformer means 4 so that the terminal potential of the current transformer 20 is proportional to the current carried by the converter 3.

The output potential of the current transformer 20 is supplied to a suitable resistance type load preferably composed of a plurality of resistors 21 connected across the phase terminals. The voltage drop across this resistor load 21 is applied to the primary of a suitable transformer 22, the output of this transformer 22 being rectified by a suitable full-wave rectifying device 23. This variable output potential is likewise supplied to a resistor-type load 24 also preferably of the potentiometer type, the bias connection 13 being made to the resistor 24 by means of a suitable adjustable contact 25.

If desired, a filter connection 30 may be supplied between the neutral point of the control device 10 and the cathode 9 of the converter 3. We have herein illustrated such a filter as comprising a series reactor 31 in the biasing circuit 13 and a capacitor 32 connected between the biasing circuit 13 and the cathode 9 of the converter 3.

Figure 2:
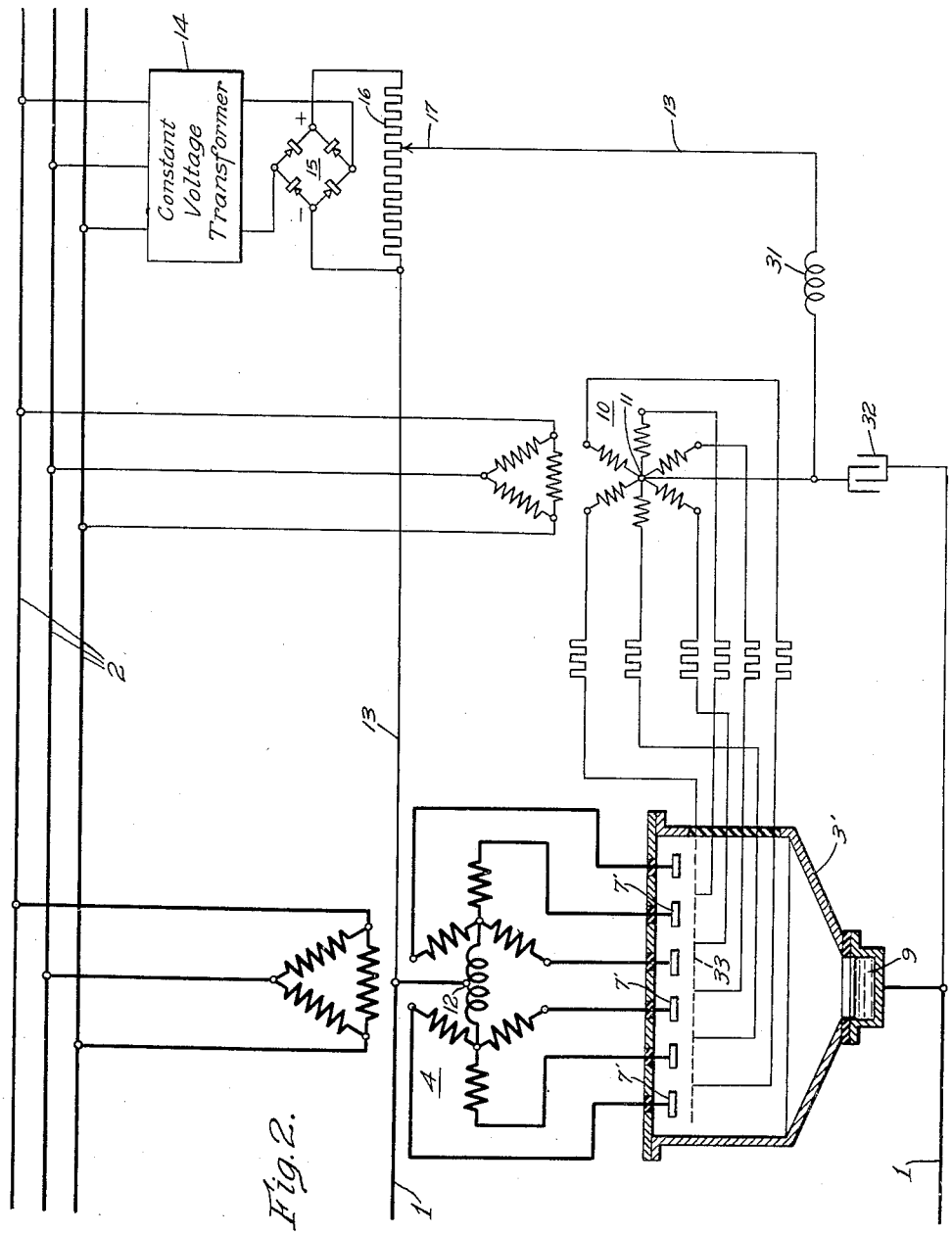
Fig. 2 is a similar view showing a modification for compensating only the supply potentials.

In the illustrative embodiment according to Fig. 2, the anodes 7' are placed in a conventional multi-valve converter 3' and the impulse device 10 supplies control impulses directly to the control grids 35 instead of to control tubes 8.

Figure 5:
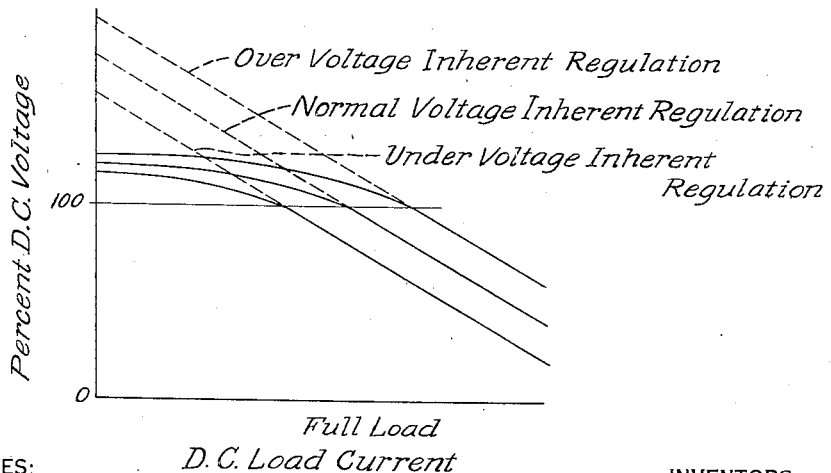
Fig. 5 is a diagrammatic illustration of the regulation characteristics obtained by the modification according to Fig. 2.

The modification according to this embodiment dispenses with load regulation utilizing only line compensation, the regulation being provided by a constant potential device 14 supplying a positive bias to counter-balance the terminal potential applied as a negative bias to the control device 10. In the operation of this modification, the constant potential bias is adjusted so that it substantially counteracts the negative bias applied from the negative terminal 12 of the direct-current circuit 1, so that the no-load terminal voltage is of the desired value. As load is applied to the converter, the terminal voltage will tend to decrease. This decrease in terminal voltage decreases the negative bias and makes the positive constant potential bias effective to advance the firing angle of the converter 3' so that the terminal voltage tends to increase. Obviously, throughout the entire regulation range any decrease in the terminal voltage, whether from load or from variation of the alternating-current potential, will serve to advance the firing angle of the valves of the converter 3', so that the terminal potential will remain substantially constant throughout the desired load range, as is illustrated in Fig. 5.

Figure 3:
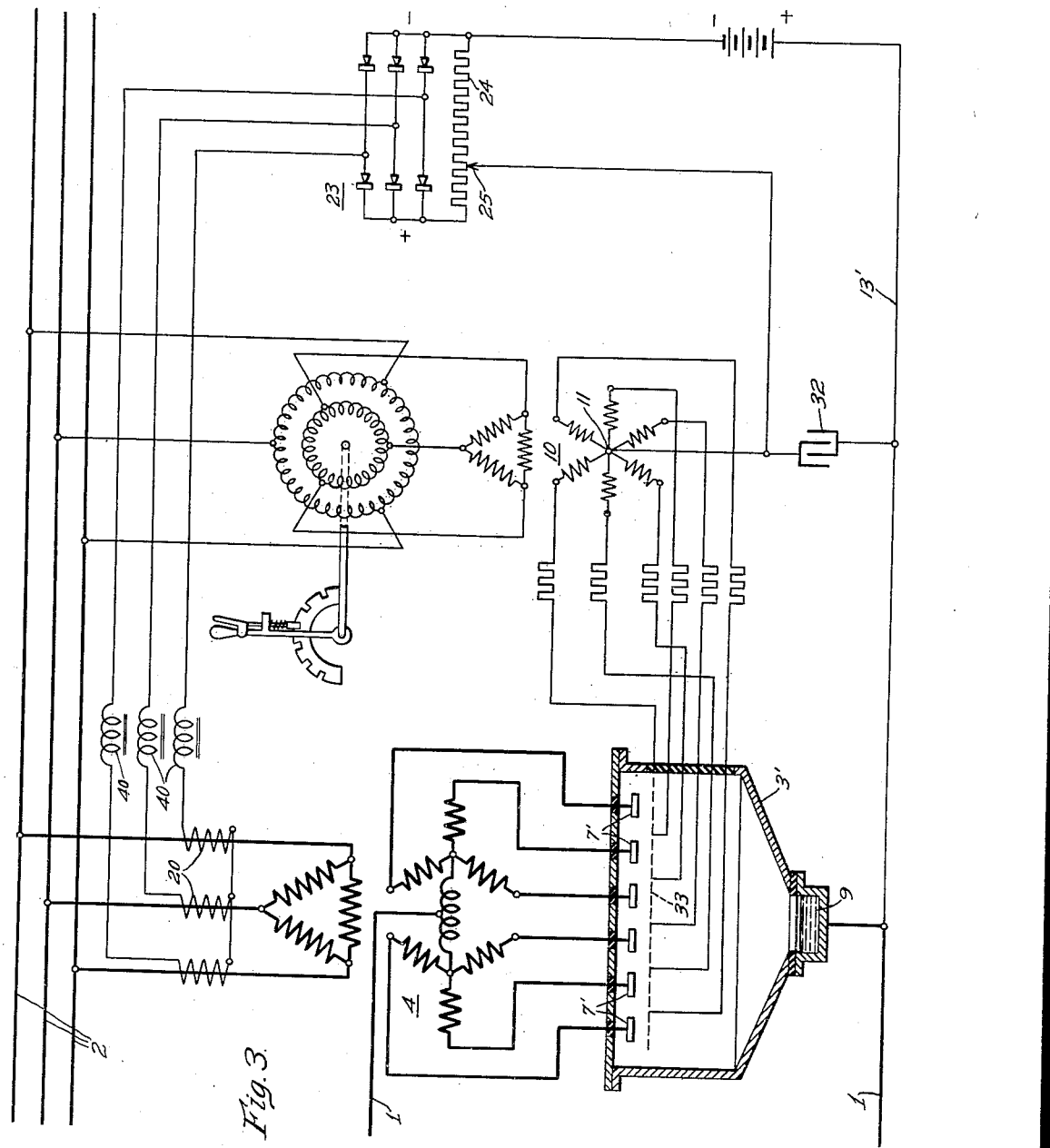
Fig. 3 is a similar view showing a modification utilizing only compensation of the current regulation.
Figure 6:
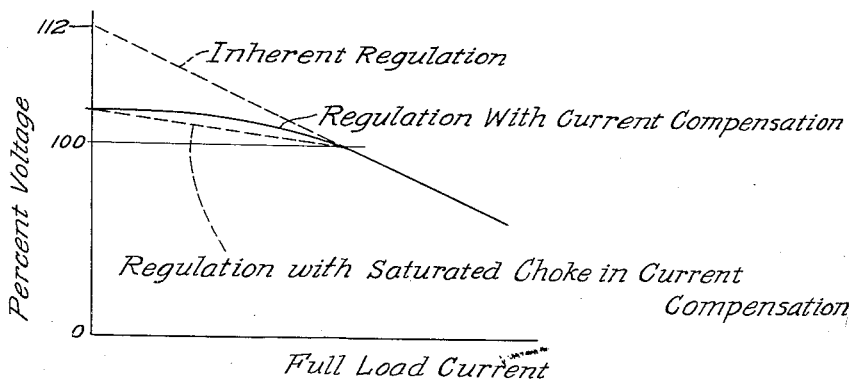
Fig. 6 is a diagrammatic illustration showing the resultant regulation characteristic according to our invention.

In the embodiment according to Fig. 3, the constant potential bias 14 to 16 has been omitted and only a potential corresponding to the load variation is applied as a bias to the control device 10. The current-responsive transformer 20 supplies a variable potential to the control device 10 so that as the load current increases, the positive bias applied to the control device 24 increases to advance the firing angle of the converter 3', and by proper adjustment of the ratio of the bias potentials, a substantially flat characteristic can be obtained. However, this characteristic might be further improved by applying saturating chokes 40 in series with the current transformer 20, so that at low loads on the converter 3' the chokes 40 will be operative to materially reduce the positive bias potential while at higher loads on the converter, the chokes will be saturated to permit the relatively larger proportional flow of current from the current transformers 20, so that the regulation will have the characteristic shown in Fig. 6.

Figure 4:
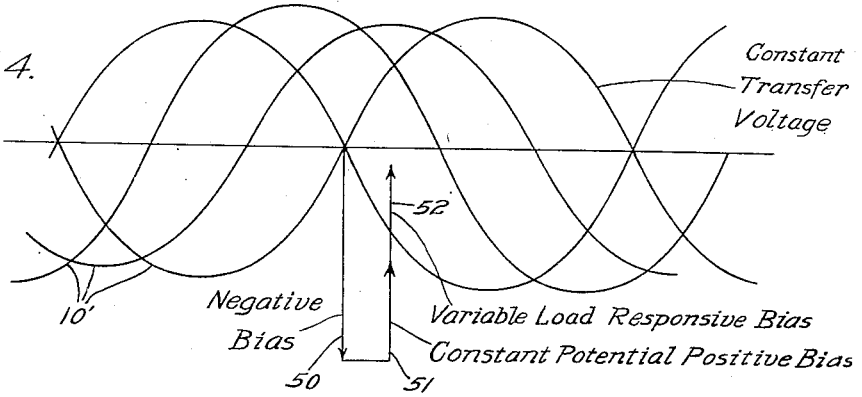
Fig. 4 is a diagrammatic illustration of the potentials and their operating relation to each other.

The operation according to this construction is best understood by reference to Fig. 4 in which the control potentials are diagrammatically illustrated. The control potential 10' supplied by impulse device 10 is biased by means of a negative potential 50 which is equal to, and preferably supplied by, a direct connection to the negative terminal 12 of the direct-current circuit 1, this negative bias 50 being counter-balanced to a certain extent by a positive bias 51 supplied from a constant potential source 14 and being further compensated by the variable bias 52 supplied by the current transformer 20. Preferably, the sum of the biases 51 and 52 supplied by the constant potential device 14 and the potential supplied by the variable potential device 20 is of the order of magnitude of the negative potential 50 supplied by the direct-current circuit 1. However, it is desirable, particularly at low load, that there be a slight difference in the magnitudes so that the algebraic sum of the biasing potentials is such that at light load the firing delay is increased so that the grids will be released with such angle of delay that the terminal potential is but little increased over the normal full-load potential of the device. Then as the load increases the variable potential 52 supplied by the current transformer 20 increases to advance the firing time so that at a predetermined load the terminal potential is the maximum terminal potential available in the converter 3. In other words, the converter is operating at zero angle of delay.

While for purposes of illustration we have shown and described a specific embodiment of our invention, it will be apparent that many changes and modifications can be made therein without departing from the true spirit of our invention or the scope of the appended claims.

We claim as our invention:

1. An electric current conversion system for transferring electric energy between an alternating-current system and a direct-current system, comprising a plurality of electric valves interconnecting said systems, a control electrode for each of said valves, a control transformer for applying control potentials to said control electrodes, a center tap in said control transformer, a connection from said center tap to the negative side of said direct-current system, a source of constant potential, means in series with said connection for impressing said constant potential on said control transformer, a current transformer associated with said alternating-current system, rectifier means for rectifying the output potential of said current transformer and means in series with said connection for impressing the rectified potential of said current transformer on said control transformer.

2. An electric current conversion system having a substantially flat regulation characteristic over a predetermined load range comprising an alternating-current circuit, a direct-current circuit, a valve type converter having a plurality of valves interconnecting said circuits, transformer means for distributing current to said valves, control electrodes for said valves, a control device for distributing control potential to said control electrodes, a connection from said control device to the negative side of said direct-current circuit for impressing the direct-current potential of the direct-current circuit on said control device as a negative bias, a source of constant potential alternating current, means for rectifying said constant potential, a resistor fed by said rectified constant potential, means for impressing the voltage drop across at least a portion of said resistor on said control device as a bias, a current transformer linked with the alternating-current circuit, means for rectifying the output of said current transformer, a resistor fed by the rectified output of said current transformer, and means for impressing at least a portion of the voltage drop across said resistor on the control device as a bias, the sum of the voltage drops across the resistors being of the same order of magnitude as the bias impressed by the direct-current circuit.

3. A conversion system having a compound load characteristic comprising a multi-valve converter, transformer means for distributing potential to the valves of the converter, a control electrode for each valve of said converter, a control transformer for impressing control potentials on said control electrodes, a current transformer associated with said transformer means, a rectifying device fed by said current transformer, means for impressing the output potential of said rectifying device on the control transformer, and saturating reactors in series with said current transformer for controlling the potential impressed on said control transformer.

4. An electric current conversion system having a predetermined regulation characteristic comprising an alternating-current circuit, a direct-current circuit, a multi-valve converter interconnecting said circuits, transformer means for distributing current to said converter, control electrodes associated with the valves of said converter, a control transformer for distributing control potential to said control electrodes, a connection for impressing the negative direct-current load potential on said control transformer, a source of constant potential alternating current, means for rectifying said constant alternating potential for producing a constant direct-current potential, means impressing said constant potential in opposition to said load potential so that the terminal potential of the converter is maintained substantially constant regardless of fluctuation of alternating-current circuit potential, a current transformer associated with the alternating-current circuit, resistors connected across said current transformer, a transformer energized by the potential appearing across said resistors, means for rectifying the output of said transformer, and means for impressing the output potential of said rectifying means on said control transformer in series with said load potential and said constant direct-current potential to compensate the regulation drop imposed on said converter by the load current.

JOSEPH H. COX.
LEE A. KILGORE.